(12) United States Patent
Akiyama

(10) Patent No.: US 9,481,364 B2
(45) Date of Patent: Nov. 1, 2016

(54) DRIVE ASSIST DEVICE

(71) Applicant: TOYOTA JIDOSHA KABUSHIKI KAISHA, Toyota-shi, Aichi (JP)

(72) Inventor: Tomonori Akiyama, Shizuoka (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 14/650,328

(22) PCT Filed: Feb. 7, 2013

(86) PCT No.: PCT/JP2013/052908
§ 371 (c)(1),
(2) Date: Jun. 8, 2015

(87) PCT Pub. No.: WO2014/122755
PCT Pub. Date: Aug. 14, 2014

(65) Prior Publication Data
US 2015/0336574 A1   Nov. 26, 2015

(51) Int. Cl.
*B60W 30/08* (2012.01)
*G08G 1/16* (2006.01)

(52) U.S. Cl.
CPC ............. *B60W 30/08* (2013.01); *G08G 1/16* (2013.01); *G08G 1/166* (2013.01)

(58) Field of Classification Search
CPC ........ B60W 30/08; G08G 1/16; G08G 1/166
USPC ....................................................... 701/301
See application file for complete search history.

(56) References Cited

U.S. PATENT DOCUMENTS

| | | | |
|---|---|---|---|
| 5,754,099 A * | 5/1998 | Nishimura | B60T 7/22 340/435 |
| 5,818,355 A | 10/1998 | Shirai et al. | |
| 2010/0030426 A1* | 2/2010 | Okita | B60T 7/22 701/41 |
| 2010/0253492 A1* | 10/2010 | Seder | G01S 13/723 340/435 |
| 2010/0292886 A1* | 11/2010 | Szczerba | G01C 21/365 701/31.4 |

FOREIGN PATENT DOCUMENTS

| | | |
|---|---|---|
| CN | 101641248 A | 2/2010 |
| JP | 216484 A | 1/1990 |
| JP | 6243399 A | 9/1994 |
| JP | 7262499 A | 10/1995 |
| JP | 9175295 A | 7/1997 |
| JP | 4814928 B2 | 11/2011 |

* cited by examiner

*Primary Examiner* — Brian P Sweeney
(74) *Attorney, Agent, or Firm* — Sughrue Mion, PLLC

(57) ABSTRACT

A drive assist device includes an object detection unit that is configured to detect an object in front of a host vehicle, a curve detection unit that is configured to detect a curved path in front of the host vehicle, a collision determination unit that is configured to determine a collision between the host vehicle and the object, and in a case where the curved path is detected, makes it difficult to determine the object detected in the direction opposite to the curving direction as an obstacle compared to an object detected in the curving direction, and a collision determination unit that is configured to perform a collision avoidance assist on the host vehicle in a case where it is determined that the host vehicle and the obstacle may collide with each other.

13 Claims, 6 Drawing Sheets

(a)

(b)

Fig.3
(a)
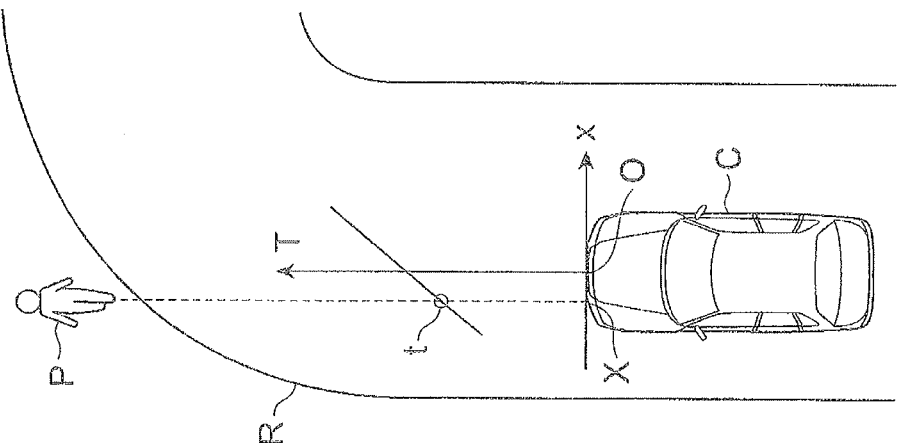
(b)
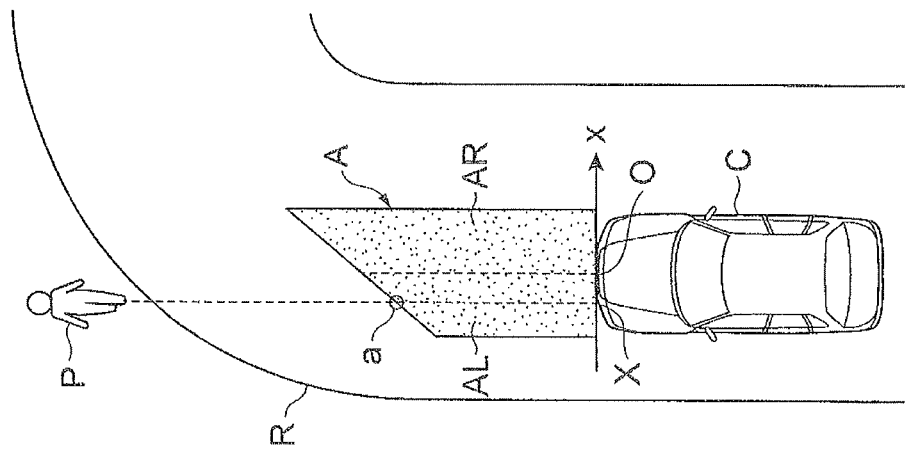

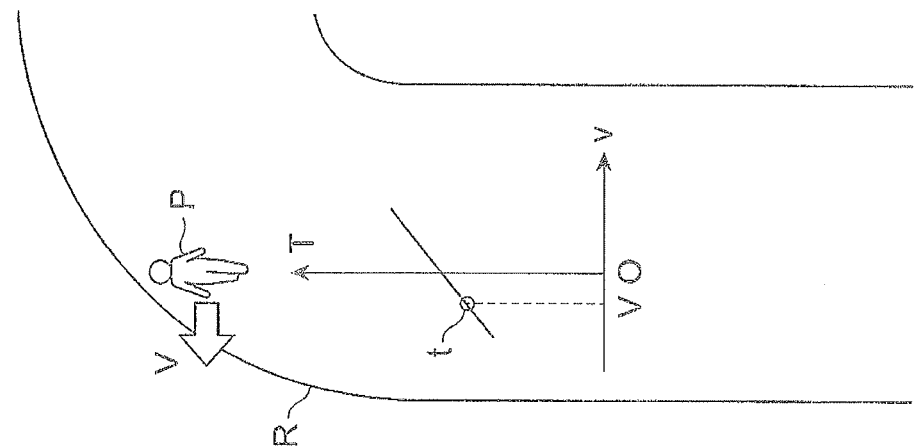
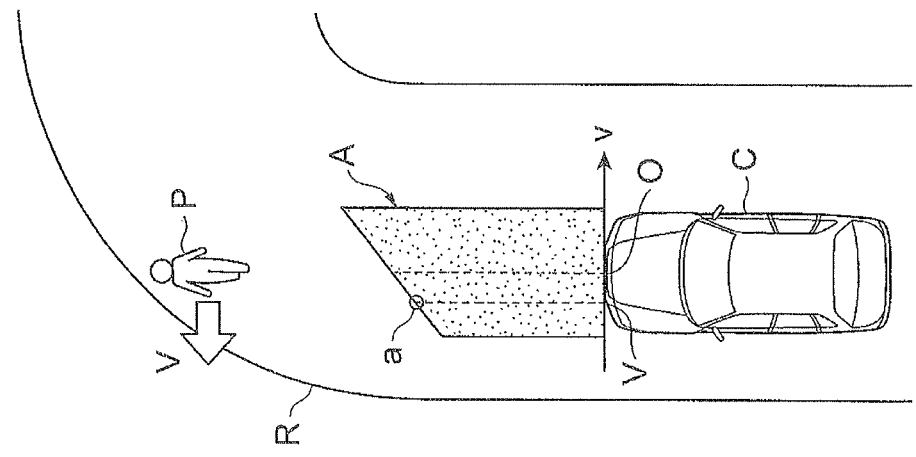
Fig. 4

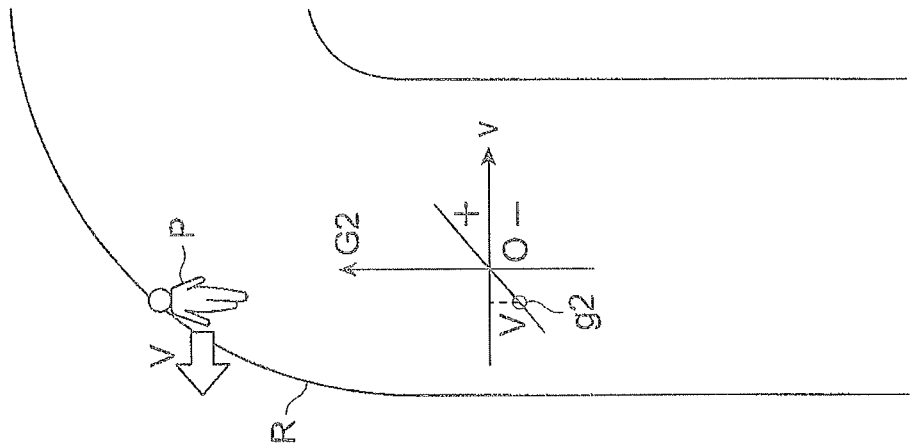
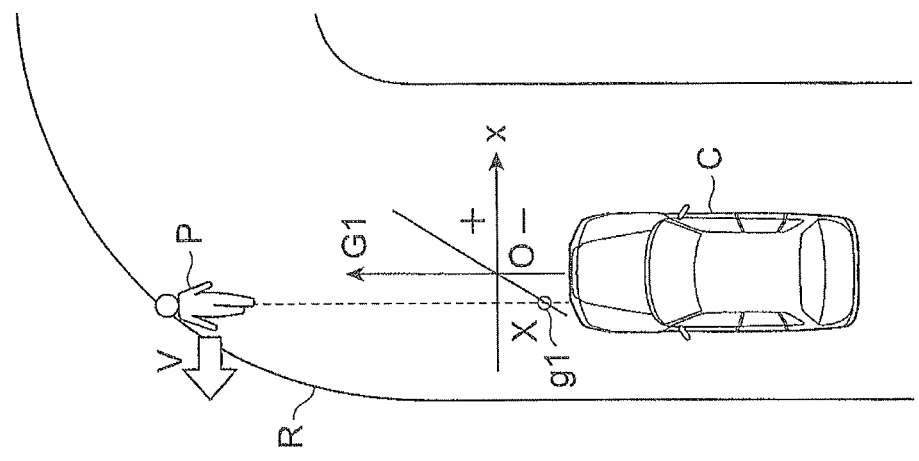
Fig. 6

DRIVE ASSIST DEVICE

CROSS REFERENCE TO RELATED APPLICATIONS

This application is a National Stage of International Application No. PCT/JP2013/052908 filed Feb. 7, 2013, the contents of all of which are incorporated herein by reference in their entirety.

TECHNICAL FIELD

The present invention relates to a drive assist device that is configured to assist a driving of a vehicle.

BACKGROUND ART

In the related art, with regard to a drive assist device, for example, as disclosed in Japanese Unexamined Patent Application Publication No. 6-243399, a vehicle-to-vehicle distance warning device that measures a vehicle-to-vehicle distance between a host vehicle and a preceding vehicle, calculates a safety vehicle-to-vehicle distance in which the host vehicle does not collide with the preceding vehicle using a host vehicle speed and the vehicle-to-vehicle distance, and generates an alarm in a case where the vehicle-to-vehicle distance is shorter than the safety vehicle-to-vehicle distance.

CITATION LIST

Patent Literature

[Patent Literature 1] Japanese Unexamined Patent Application Publication No. 6-243399

SUMMARY OF INVENTION

Technical Problem

However, in the vehicle-to-vehicle distance warning device described above, in an entrance of a curve, for example, there is a problem in that the drive assist may erroneously be operated due to an erroneous determination of the object detected at an outside of a travel path as an obstacle.

Therefore, an object of the present invention is to provide a drive assist device in which an erroneous operation at an entrance of a curve can be suppressed.

Solution to Problem

A drive assist device in the present invention includes: an object detection unit that is configured to detect an object in front of a host vehicle; a curve detection unit that is configured to detect a curved path in front of the host vehicle; a collision determination unit that is configured to determine a collision between the host vehicle and the object, and in a case where the curved path is detected, makes it difficult to determine the object detected in the direction opposite to the curving direction as an obstacle compared to an object detected in the curving direction; and a collision determination unit that is configured to perform a collision avoidance assist on the host vehicle in a case where the object is determined as the obstacle.

In this configuration, since it is more difficult to determine the object detected in the direction opposite to the curving direction as an obstacle than to determine the object detected in a curving direction as the obstacle, it is possible to delay the operation of the collision avoidance assist. Therefore, it is possible to suppress an erroneous operation of the drive assist at an entrance of the curve.

Advantageous Effects of Invention

According to the present invention, it is possible to provide a drive assist device in which an erroneous operation at an entrance of a curve can be suppressed.

BRIEF DESCRIPTION OF DRAWINGS

FIG. 3 is a diagram illustrating examples of a determination condition based on a position of an object.

FIG. 4 is a diagram illustrating examples of a determination condition based on a moving speed of an object.

FIG. 6 is a diagram illustrating other examples of a determination condition based on the position and the moving speed of the object.

DESCRIPTION OF EMBODIMENTS

Hereinafter, a drive assist device in an embodiment of the present invention will be described in detail with reference to the drawings. In the description of the drawings, the same signs will be given to the same elements and the description thereof will not be repeated.

Figure 1:
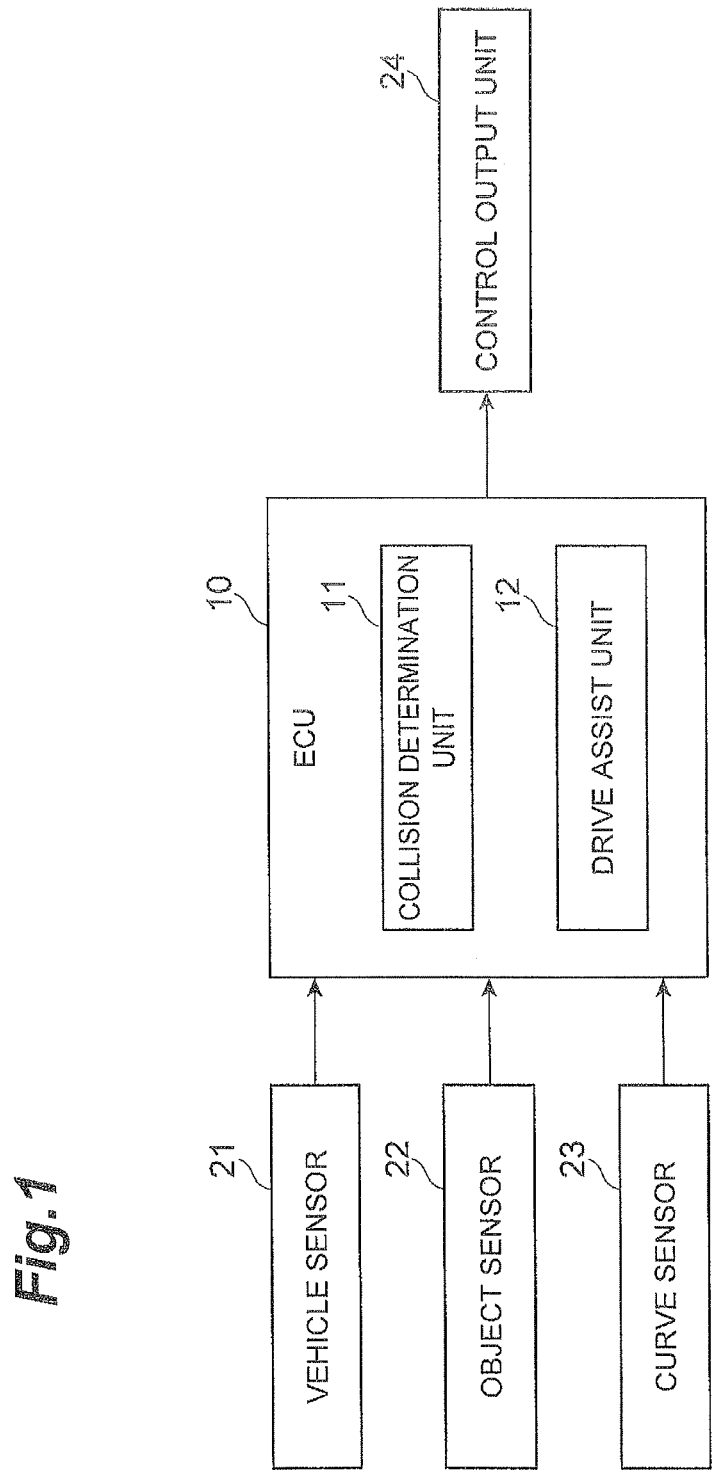
FIG. 1 is a block diagram illustrating a drive assist device in an embodiment of the present invention.

First, a configuration of the drive assist device in the embodiment of the present invention will be described with reference to FIG. 1. FIG. 1 is a block diagram illustrating a drive assist device in an embodiment of the present invention. The drive assist device is a device that is mounted on a host vehicle and assists the driving of the host vehicle.

As illustrated in FIG. 1, the drive assist device is configured with an electronic control unit 10 (hereinafter, referred to as ECU 10) as a center. A vehicle sensor 21, an object sensor 22, a curve sensor 23, and a control output unit 24 are connected to the ECU 10.

The vehicle sensor 21 is a sensor that detects at least a position and a speed of a host vehicle. As the vehicle sensor 21, for example, a position sensor such as a GPS (global positioning system) sensor, a vehicle wheel speed sensor, an acceleration sensor, a steering angle sensor, a torque sensor, and a yaw rate sensor are used.

The object sensor 22 functions as an object detection unit that detects an object in front of the host vehicle. As the object sensor 22, for example, a stereo camera, a monochrome camera, a millimeter wave radar, and a laser radar are used. The object sensor 22 may be also used as a curve sensor 23 described below. The object sensor 22 detects at least a position of the object, that is, a vehicle-to-vehicle distance between the host vehicle and the object. For example, moving objects and stationary objects such as a pedestrian, a bicycle, another vehicle, and a structural object are included in the object.

The curve sensor 23 functions as a curve detection unit that detects a curved path in front of the host vehicle. As the curve sensor 23, for example, a stereo camera and a monochrome camera are used. The curve sensor 23 may detect the curved path using the position of the host vehicle detected by the position sensor and map information. The curve sensor 23 detects a position of the curved path and a curving direction, that is, the curvature direction of the travel path. The curving direction is detected based on a partition lines such as a roadway center line, a roadway boundary line, a side line outside the roadway, or an arrangement of a roadway structural object such as a guard rail, curbstone, and a gutter.

The control output unit 24 outputs a control signal used in a collision avoidance assist to at least one of a brake device or a steering device. As the control output unit 24, a brake actuator and a steering actuator are used.

The ECU 10 includes a collision determination unit 11 and a drive assist unit 12. The ECU 10 is mainly configured with a CPU, a ROM, and a RAM, and the functions of the collision determination unit 11 and the drive assist unit 12 are realized by an execution of a program by the CPU. The functions of the collision determination unit 11 and the drive assist unit 12 may be realized by two or more ECUs.

The collision determination unit 11 determines a collision or a possibility of collision between the host vehicle and the object. In a case where the curved path is detected, the collision determination unit 11 makes it more difficult to determine the object detected in the direction opposite to the curving direction as an obstacle than to determine the object detected in a curving direction as the obstacle. That is, the collision determination unit 11 makes it difficult to determine that the collision between the object detected in the direction opposite to the curving direction and the host vehicle occurs or the possibility of such collision is high. The curving direction means a curvature direction side of the travel path with a center of the host vehicle as a reference, and the direction opposite to the curving direction means a side opposite thereto. The obstacle is an object subject to the collision avoidance assist.

The collision determination unit 11 sets a determination condition in the direction opposite to the curving direction and a determination condition in a curving direction such that it is more difficult to determine the object detected in the direction opposite to the curving direction as an obstacle than to determine the object detected in a curving direction as the obstacle. As the determination condition, for example, a determination area or an assist start timing is used. The determination area is an area for determining whether or not the detected object is an obstacle subject to the collision avoidance assist, and is set in front of the host vehicle based on the vehicle-to-vehicle distance between the host vehicle and the object. The assist start timing is set based on a time to collision (TTC) which is obtained considering the travelling state of the host vehicle and the moving state of the object together with the positions of the host vehicle and the object.

In a case where the curved path is detected, the collision determination unit 11 sets the determination area in the direction opposite to the curving direction and the determination area in the curving direction based on at least one of the position or the moving direction of the object or the moving speed of the object. Then, in a case where the position of the object is included in the determination area, the collision determination unit 11 determines the object as an obstacle.

In addition, in a case where the curved path is detected, the collision determination unit 11 sets the assist start timing for the object detected in the direction opposite to the curving direction and the assist start timing for the object detected in the curving direction based on at least one of the position or the moving direction of the object or the moving speed of the object. Then, in a case where the time to collision is equal to or shorter than the assist start timing, the collision determination unit 11 determines the object as the obstacle.

In a case where the object is determined as the obstacle, the drive assist unit 12 performs the collision avoidance assist on the host vehicle. In a case where the determination condition is satisfied, that is, in a case where the object is detected in the determination area, or in a case where the time to collision with the object is equal to or shorter than the assist start timing, the drive assist unit 12 performs the collision avoidance assist.

A notification assist and a control assist are included in the collision avoidance assist. In the notification assist, an attention to a driver is performed through a human-machine interface (HMI) such as a display, a speaker, or a vibrator. In the control assist, a control intervention to at least one of the brake device or a steering device is performed through a control output unit 24.

At the time of control assist, the drive assist unit 12 calculates a target value of the control intervention based on the result of detection by the vehicle sensor 21, the object sensor 22, and the curve sensor 23. Then, the drive assist unit 12 performs the control assist by a feedback control based on the difference between the target value and the actual value.

Next, an operation of the drive assist device in the embodiment of the present invention will be described with reference to FIG. 2 to FIG. 6.

Figure 2:
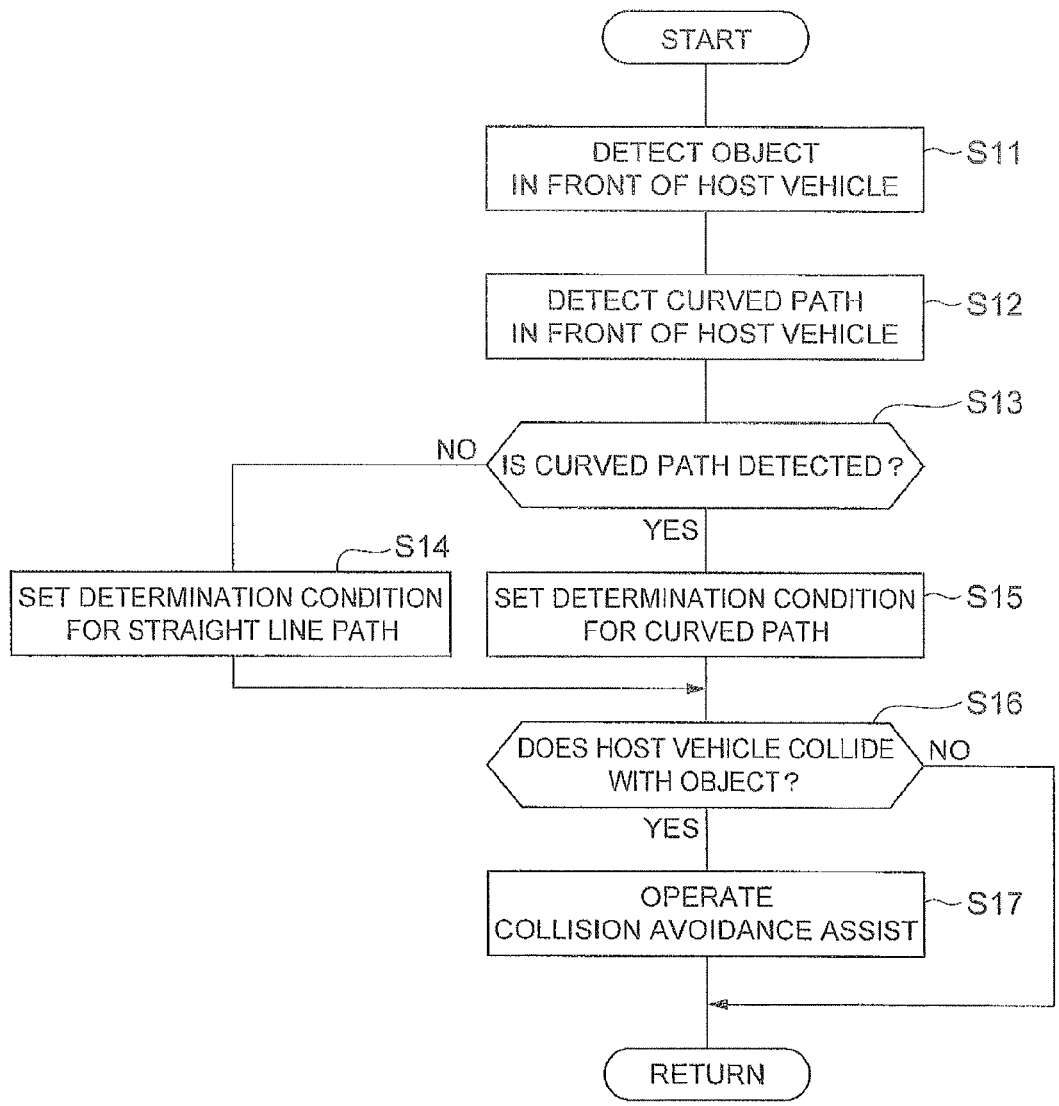
FIG. 2 is a flow chart illustrating an operation of the drive assist device.

FIG. 2 is a flow chart illustrating an operation of the drive assist device. The drive assist device repeatedly executes the processing illustrated in FIG. 2 for each set period.

As illustrated in FIG. 2, the object sensor 22 detects an object in front of the host vehicle (S11). The curve sensor 23 detects a curved path in front of the host vehicle (S12).

The collision determination unit 11 determines whether or not the curved path is detected (S13). In a case where the curved path is not detected, the collision determination unit 11 sets a determination condition for a straight line path (S14). The determination condition for the straight line path is set so as to be laterally symmetrical in the width direction of the host vehicle with the center of the vehicle as a reference.

On the other hand, in a case where the curved path is detected, the collision determination unit 11 sets the determination condition for the curved path (S15). The determination condition for the curved path is set so as to be laterally asymmetrical in the width direction of the host vehicle with the center of the vehicle as a reference. The determination condition for the curved path is set such that it is more difficult to determine the object detected in the direction opposite to the curving direction as an obstacle than to determine the object detected in a curving direction as the obstacle, and thus, in the direction opposite to the curving direction, the operation of the collision avoidance assist is delayed. Particularly, the determination condition for the curved path may be set such that a negative gain occurs in the operation timing in the direction opposite to the curving direction and a positive gain occurs in the curving direction, with the determination condition for the straight line path as a reference.

That is, in a case where the determination area is used as the determination condition, the determination area in the direction opposite to the curving direction is set to be smaller than the determination area in the curving direction. Here, the size of the determination area means a spread of the area from the host vehicle to the area in front the host vehicle.

Particularly, in a case where an object is detected in the direction opposite to the curving direction, the determination area in the direction opposite to the curving direction is set to be smaller than the determination area in the curving direction. On the other hand, in a case where the object is detected in the curving direction, the determination area in the curving direction is set to be greater than the determination area in the direction opposite to the curving direction.

In addition, in a case where an object moving in the direction opposite to the curving direction is detected, the determination area in the direction opposite to the curving direction is set to be smaller than the determination area in the curving direction. On the other hand, in a case where an object moving in the curving direction is detected, the determination area in the curving direction is set to be greater than the determination area in the direction opposite to the curving direction.

In addition, in a case where the assist start timing is used as the determination condition, the assist start timing for the object detected in the direction opposite to the curving direction is set to be delayed compared to the assist start timing for the object detected in the curving direction. In addition, in a case where an object moving in the direction opposite to the curving direction is detected, the assist start timing for the object detected in the direction opposite to the curving direction is set to be delayed compared to the assist start timing for the object detected in the curving direction.

The collision determination unit 11 determines the collision or the possibility of the collision between the host vehicle and the object (S16). That is, the collision determination unit 11 determines whether or not an object is detected in the determination area or whether or not the time to collision with the object is equal to or less than the assist start timing. Then, in a case where the collision of the host vehicle collides with the object or the possibility of collision is equal to or greater than a threshold value, and then, the object is determined as the obstacle, the drive assist unit 12 performs the collision avoidance assist on the host vehicle (S17). That is, in a case where the determination condition is satisfied, the drive assist unit 12 operates at least one of the notification assist or the control assist.

FIG. 3 to FIG. 6 are diagrams illustrating the examples of setting conditions. In the examples illustrated in FIG. 3 to FIG. 6, a host vehicle C intends to enter a right-curved path R. In this case, the host vehicle C is assumed to be steered in the curving direction, that is, in the right direction, and thus, with host vehicle C as a reference, the determination condition is set such that the operation of the collision avoidance assist is delayed in the direction opposite to the curving direction, that is, the left direction, compared to the curving direction, that is, the right direction.

The determination conditions illustrated in FIG. 3 to FIG. 6 are just examples, and the determination condition may be set in another aspect such as a curvilinear change. In addition, the determination condition may be set considering a curvature or radius of the curve, a lane width of the travel path, or the speed of the host vehicle.

FIG. 3 is diagrams illustrating examples of a determination condition based on a position of an object. In the examples illustrated in FIG. 3, a determination area A for the curved path is set such that a determination area AL in the direction opposite to the curving direction, that is, the left direction with respect to the center of the host vehicle is smaller than a determination area AR in the curving direction, that is, the right direction, as illustrated FIG. 3(a). That is, determination area A is set such that the spread of area to the front of the host vehicle is smaller when coming further to the left side in the width direction of the host vehicle and is larger when coming further to the right side.

In addition, as illustrated in FIG. 3(b), the assist start timing for curved path is set such that the assist start timing for the object detected in the direction opposite to the curving direction that is, the left direction is delayed compared to the assist start timing for the object detected in the curving direction, the right direction. In the drawing, it means that the assist start timing is more advanced when T becomes longer. That is, the assist start timing is set so as to be more delayed when further coming to the left side in the width direction of the host vehicle, and to be more advanced when further coming to the right side.

When the determination condition is set, a position in the width direction of the host vehicle, in which the collision between the host vehicle C and the object is expected, that is, a lateral collision position X, is obtained based on the result of detection by the vehicle sensor 21 and the object sensor 22. The lateral collision position X is obtained under the consumption that the host vehicle C travels along the travel path in the current travel state and the object holds the current moving state or the stationary state.

In the examples in FIG. 3, a pedestrian P in a stationary state exists outside of the travel path in front of the host vehicle in the direction opposite to the curving direction, that is, in the left direction. Accordingly, the lateral collision position X is obtained to be the left side of the host vehicle C, that is, to be the direction opposite to the curving direction. Therefore, in the example illustrated in FIG. 3(a), in a case where the pedestrian P and the host vehicle C relatively approach a point a, and in the example illustrated in FIG. 3(b), in a case where the time to collision is less than time t, the determination condition comes to be satisfied.

For this reason, the operation of the collision avoidance assist is delayed based on the determination condition and the lateral collision position X compared to the case where the lateral collision position X is in the curving direction. Particularly, in the example illustrated in FIG. 3, the operation of the collision avoidance assist is more delayed when the lateral collision position X comes further to the left side in the width direction of the host vehicle. In this way, in a case where the object is detected in the direction opposite to the curving direction, it becomes difficult to determine the object as the obstacle compared to a case where the object is detected in the curving direction, and thus, it is possible to make the operation of the collision avoidance assist be delayed.

FIG. 4 is diagram illustrating examples of a determination condition based on the moving speed of the object. In the examples in FIG. 4 also, the determination area A for the curved path is set such that the spread of area to the front of the host vehicle from the host vehicle C is smaller when coming further to the left side in the width direction of the host vehicle, and is greater when further coming to the right side as illustrated FIG. 4(a). In addition, the assist start timing for curved path is set so as to be more delayed when further e coming to the left side in the width direction of the host vehicle, and to be more advanced when further coming to the right side as illustrated in FIG. 4(b). In the drawing, it means that the assist start timing is more advanced when T becomes longer.

When the determination condition is set, the moving speed V (or the moving direction) of the object in the width direction of the host vehicle is obtained based on the result of detection by the object sensor 22.

In the examples in FIG. 4, the pedestrian P is moving on the travel path in front of the host vehicle at a speed V in the direction opposite to the curving direction, that is, in the left direction. Accordingly, the moving direction is obtained to be the left side of the host vehicle C, that is, to be the direction opposite to the curving direction. Therefore, in the example illustrated in FIG. 4(a), in a case where the pedestrian P and the host vehicle C relatively approach a point a, and in the example illustrated in FIG. 4(b), in a case where the time to collision is less than time t, the determination condition comes to be satisfied.

For this reason, the operation of the collision avoidance assist is delayed based on the determination condition and the moving speed V (or the moving direction) compared to the case where the moving direction is the curving direction. Particularly in the example illustrated in FIG. 4, the operation of the collision avoidance assist is more delayed when the moving speed V in the direction opposite to the curving direction becomes higher. In this way, in a case where the object moving in the direction opposite to the curving direction is detected, it becomes difficult to determine the object as the obstacle compared to a case where the object moving in the curving direction is detected, and thus, it is possible to make the operation of the collision avoidance assist be delayed.

Figure 5:
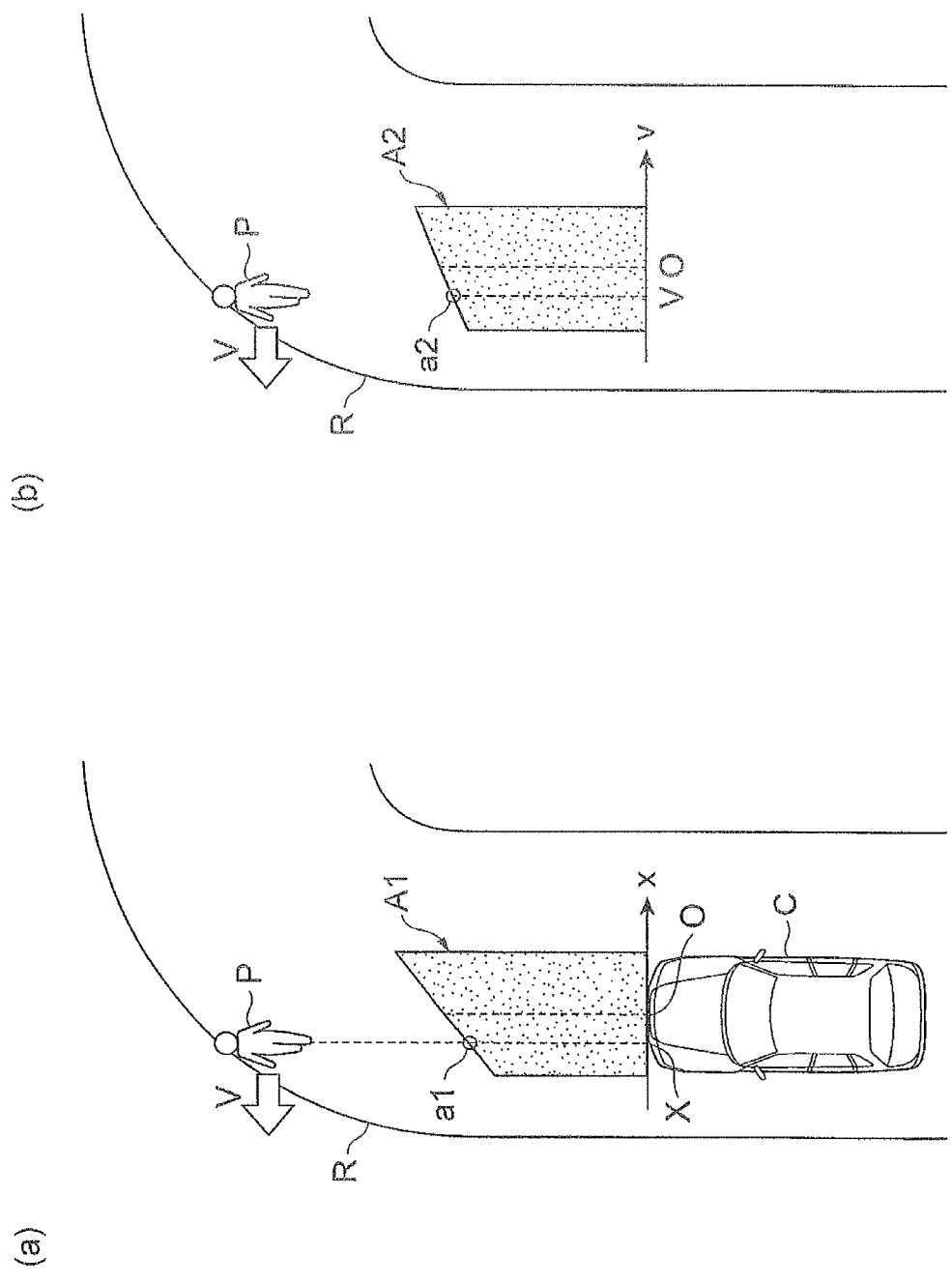
FIG. 5 is a diagram illustrating examples of a determination condition based on the position and the moving speed of the object.

FIG. 5 is a diagram illustrating examples of a determination condition based on the position and the moving speed of the object. In the examples in FIG. 5, the determination area A for the curved path is set as a combination of a first determination area A1 which is based on the position of the object and a second determination area A2 which is based on the moving speed of the object. The first and second determination areas A1 and A2 are set such that the spread of area to the front of the host vehicle from the host vehicle C is smaller when coming further to the left side in the width direction of the host vehicle, and is greater when further coming to the right side similar to the cases illustrated in FIGS. 3(a) and 4(a).

When the determination condition is set, the lateral collision position X between the host vehicle C and the object, and the moving speed V of the object (or the moving direction) are obtained.

In the examples in FIG. 5, the pedestrian P existing in front of the host vehicle in the direction opposite to the curving direction, that is, in the left direction, is moving on the travel path in front of the host vehicle in the direction opposite to the curving direction. Accordingly, the lateral collision position X is obtained to be the left side of the host vehicle C, that is, to be the direction opposite to the curving direction. Furthermore, the moving direction is obtained to be the left side of the host vehicle C, that is, to be the direction opposite to the curving direction. Therefore, in the examples illustrated in FIG. 5, in a case where the pedestrian P and the host vehicle C relatively approach a point a1 and approach a point a2, the determination condition comes to be satisfied.

For this reason, the operation of the collision avoidance assist is delayed based on the determination condition, the lateral collision position X, and the moving speed V (or the moving direction) compared to the case where the lateral collision position X is in the curving direction and further compared to the case where the moving direction is the curving direction. That is, the operation of the collision avoidance assist is determined by the combination of the determination result based on the first determination area A1 and the determination result based on the second determination area A2.

FIG. 6 is a diagram illustrating other examples of the determination condition based on the position and the moving speed of the object. In FIG. 6, a first gain G1 and a second gain G2 that are used for setting the determination condition for the curved path are illustrated. The first and second gains G1 and G2 are set such that the operation of the collision avoidance assist in the direction opposite to the curving direction is more delayed than that in the curving direction. The determination condition for the curved path is set by adjusting the determination condition for the straight line path based on the first and second gains G1 and G2. The determination condition for the straight line path is adjusted such that the operation is advanced in correspondence to the positive gain and is delayed in correspondence to the negative gain.

First, the lateral collision position X between the host vehicle C and the object, and the moving speed V of the object (moving direction) are obtained. Next, a gain value g1 is obtained based on the lateral collision position X and the gain value g2 is obtained based on the moving speed V. Then, for example, as a sum or product of the gain values g1 and g2, a synthesized gain is obtained. Then, the determination condition for the curved path is set based on the synthesized gain. That is, the determination condition for the curved path is set such that the operation of the collision avoidance assist is more delayed when the synthesized gain becomes smaller.

For this reason, the operation of the collision avoidance assist is delayed compared to the case where the lateral collision position X is in the curving direction and further compared to the case where the moving direction is the curving direction based on the determination condition, the lateral collision position X, and the moving speed V (or the moving direction).

In this way, in a case where the object moving in the direction opposite to the curving direction is detected in the direction opposite to the curving direction, it becomes difficult to determine the object as the obstacle compared to the case where the object moving in curving direction is detected in the direction opposite to the curving direction, and thus, it is possible to make the operation of the collision avoidance assist be delayed.

In the embodiment described above, a best mode of embodiment of the drive assist device in the present invention is described, and the drive assist device in the present invention is not limited to the device described in the present embodiment. The drive assist device in the present invention may be a device which is modified from the drive assist device in the present embodiment or may be a device adopted in another device without departing from the scope of the invention described in the aspects of the invention.

For example, in the description in FIG. 3 to FIG. 6, the case where the host vehicle C enters the right-curved path R is described. However, a case where the host vehicle C enters a left-curved path can be described. In addition, in the description in FIG. 5, as the determination condition, only the case where the determination area is used is described. However, the description can be made with regard to a case where assist start timing is used or the case where the combination of the determination area and the assist start timing is used as similar to the case in FIG. 3 or FIG. 4.

In addition, in the embodiment described above, in a case where the curved path is detected, it is more difficult to determine the object detected in the direction opposite to the curving direction as an obstacle than to determine the object detected in a curving direction. However, in a case where the curved path is detected, it may be difficult to determine the object detected in the direction opposite to the curving direction as the obstacle compared to a case where the curved path is not detected. In this case, a determination criteria similar to the object detected on the straight line path is applied to the object detected in the curving direction.

REFERENCE SIGNS LIST

10 ELECTRONIC CONTROL UNIT (ECU)
11 COLLISION DETERMINATION UNIT
12 DRIVE ASSIST UNIT
21 VEHICLE SENSOR
22 OBJECT SENSOR
23 CURVE SENSOR
24 CONTROL OUTPUT UNIT

The invention claimed is:
1. A drive assist device comprising:
an object detection unit configured to detect an object in front of a host vehicle;
a curve detection unit configured to detect a curved path in front of the host vehicle; and
an electronic control unit comprising:
a collision determination unit that is configured to determine a collision between the host vehicle and the object, and in a case where the curved path is detected, makes it difficult to determine the object detected in a direction opposite to a curving direction as an obstacle compared to the object detected in the curving direction; and
a drive assist unit that is configured to perform a collision avoidance assist on the host vehicle by a notification assist or a control assist in a case where the object is determined as the obstacle,
wherein, in a case where the curved path is not detected, the collision determination unit sets a determination condition for straight line path, which is laterally symmetrical in a width direction of the host vehicle with a center of the host vehicle as a reference, and
wherein, in a case where the curved path is detected, the collision determination unit sets a gain such that an operation of the collision avoidance assist is more delayed in the direction opposite to the curving direction than that in the curving direction, and sets a determination condition for the curved path by adjusting the determination condition for the straight line path based on the gain.
2. The drive assist device according to claim 1,
wherein the collision determination unit sets a determination area in front of the host vehicle as the determination condition, and
wherein, in a case where the object is detected in the determination area, the drive assist unit performs the collision avoidance assist on the host vehicle.
3. The drive assist device according to claim 2,
wherein, in a case where the curved path is detected and the object is detected in the direction opposite to the curving direction, the collision determination unit sets a negative gain in the direction opposite to the curving direction such that the operation of the collision avoidance assist is delayed in the direction opposite to the curving direction.
4. The drive assist device according to claim 2,
wherein, in a case where the curved path is detected and the object is detected in the curving direction, the collision determination unit sets a positive gain in the curving direction such that the operation of the collision avoidance assist is advanced in the curving direction.
5. The drive assist device according to claim 2,
wherein, in a case where the curved path is detected and the object moving in the direction opposite to the curving direction is detected, the collision determination unit sets a negative gain in the direction opposite to the curving direction such that the operation of the collision avoidance assist is delayed in the direction opposite to the curving direction.
6. The drive assist device according to claim 2,
wherein, in a case where the curved path is detected and the object moving in the curving direction is detected, the collision determination unit sets a positive gain in the curving direction such that the operation of the collision avoidance assist is advanced in the curving direction.
7. The drive assist device according to claim 2,
wherein, in a case where the curved path is detected and the object moving in the direction opposite to the curving direction is detected in the direction opposite to the curving direction, the collision determination unit sets a negative gain in the direction opposite to the curving direction such that the operation of the collision avoidance assist is delayed in the direction opposite to the curving direction.
8. The drive assist device according to claim 2,
wherein, in a case where the curved path is detected and the object moving in the curving direction is detected in the curving direction, the collision determination unit sets a positive gain in the curving direction such that the operation of the collision avoidance assist is advanced in the curving direction.
9. The drive assist device according to claim 1,
wherein the collision determination unit sets an assist start timing as the determination condition, and
wherein, in a case where a time to collision between the host vehicle and the object is equal to or less than the assist start timing, the drive assist unit performs the collision avoidance assist on the host vehicle.
10. The drive assist device according to claim 9,
wherein, in a case where the curved path is detected and the object moving in the direction opposite to the curving direction is detected, the collision determination unit sets a negative gain in the direction opposite to the curving direction such that the operation of the collision avoidance assist is delayed in the direction opposite to the curving direction.
11. The drive assist device according to claim 1,
wherein the collision determination unit sets a determination area in front of the host vehicle as the determination condition, and sets a determination area in the direction opposite to the curving direction and a determination area in the curving direction based on at least one of a position or a moving direction of the object or a moving speed of the object, and
wherein, in a case where the object is detected in the determination area, the drive assist unit performs the collision avoidance assist on the host vehicle.
12. The drive assist device according to claim 1,
wherein the collision determination unit sets an assist start timing as the determination condition, and sets an assist start timing for the object detected in the direction opposite to the curving direction and an assist start timing for the object detected in the curving direction based on at least one of the position or moving direction of the object or the moving speed of the object, and wherein, in a case where a time to collision between the host vehicle and the object is equal to or less than the assist start timing, the drive assist unit performs the collision avoidance assist on the host vehicle.

13. A drive assist device comprising:

an object detection unit configured to detect an object in front of a host vehicle;

a curve detection unit configured to detect a curved path in front of the host vehicle; and an electronic control unit configured to perform a collision determination function and a drive assist function by execution of a computer program, wherein the collision determination function is programmed to determine a collision between the host vehicle and the object, and in a case where the curved path is detected, makes it difficult to determine the object detected in a direction opposite to a curving direction as an obstacle compared to the object detected in the curving direction.

wherein the drive assist function is programmed to perform a collision avoidance assist on the host vehicle by a notification assist or a control assist in a case where the object is determined as the obstacle, wherein, in a case where the curved path is not detected, a determination condition for a straight line path is set by the collision determination function, which is laterally symmetrical in a width direction of the host vehicle with a center of the host vehicle as a reference, and wherein, in a case where the curved path is detected, a gain is set by the collision determination junction such that an operation of the collision avoidance assist is more delayed in the direction opposite to the curving direction than that in the curving direction, and a determination condition for the curved path is set by the collision determination function by adjusting the determination condition for the straight line path based on the gain.

* * * * *